COMBINATION REEL AND CONVER

Filed Oct. 1, 1962

United States Patent Office 3,231,081
Patented Jan. 25, 1966

3,231,081
COMBINATION REEL AND COVER
Walter Elterman, 144—11 70th Ave.,
Flushing 67, N.Y.
Filed Oct. 1, 1962, Ser. No. 227,132
2 Claims. (Cl. 206—52)

This invention relates generally to reels for the storage and use of tape or film, such as for example sound magnetic tape and motion picture film, and more particularly a novel and useful combination reel and cover.

It is normal practice to store tape and film reels inside of a container which protects the tape or film from ambient conditions. For this purpose a kind of box is the usual container, and this may take the form of a box and cover, a metal can with a removable cover, or the like. Thus, in addition to the reel itself, there are two separate parts, a hollow base or main container, plus a separate cover.

It is among the objects of the present invention to provide combination reel and cover construction which eliminates the main container, can or box, so that there is only the reel plus a cover element which coacts with the reel to form a protective enclosure for the contents on the reel.

Another object of the present invention lies in the provision of combination reel and cover construction which is easily manipulated from closed to open condition, and vice versa, so that the use of the reel is rapidly and conveniently accomplished.

Another object herein is the provision of structure of the class described, which by virtue of the reduction of parts, enables economies in weight, bulk, and cost.

A further object of this invention is to produce a combination reel and cover which may be fabricated by the injection molding of synthetic resin, so that the desirable properties of this material may be taken advantage of for the purposes intended.

A feature of the present construction is that the cover element is put in place and removed with a positive snap action so that accidental or unintended opening is avoided.

Another feature of this invention, is that although the reel and cover can be closely fitted to each other so as to present a clean exterior, the opening thereof is accomplished with a quick and easy motion, requiring no tools or special skill.

Another advantage of the present construction is that although the reel element ultimately forms part of the complete enclosure for the tape or film, the reel element is sufficiently close to standard that it may be used in a normal manner with all of the devices such as projectors, editors, sound recorders and playbacks, with which it would be customarily used.

These objects and other incidental ends and advantages will more fully appear in the progress of this disclosure and be pointed out in the appended claims.

In the drawings in which similar reference characters designate corresponding parts throughout the several views.

Figure 1:
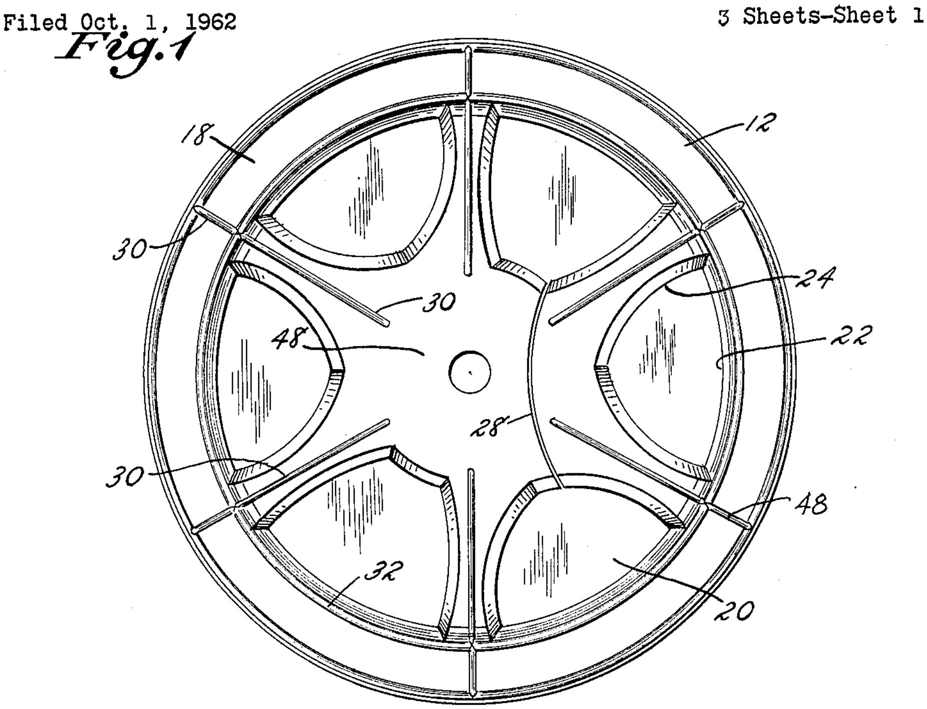
FIGURE 1 is a plan view of the reel element showing an embodiment of the invention.

In accordance with the invention, the combination reel and cover generally indicated by reference character 10, comprises broadly a reel element 12 and a cover element 14.

The reel element 12 includes a hub 16, a first flange member 18, and a second flange member 20. The first flange member is best seen in FIGURE 1 of the accompanying drawings, and is preferably of open construction having a plurality of openings 22 and spokes 24. This open construction reduces weight, allows inspection of the strip 26 of tape or film, and provides access to the hub 16 and starting slot 28 into which the leader portion of the strip 26 is placed when a winding operation is begun. Since the slot 28 is disposed not only in the hub 16 but also in the first flange member 18, the threading of the strip leader is quick, easy and positive. The first flange member may have integral stiffening radial ribs 30 and circular ribs 32. First flange member 18 is connected to the hub 16 in any suitable manner as for example by cementing, and is of a predetermined diameter.

Figure 2:
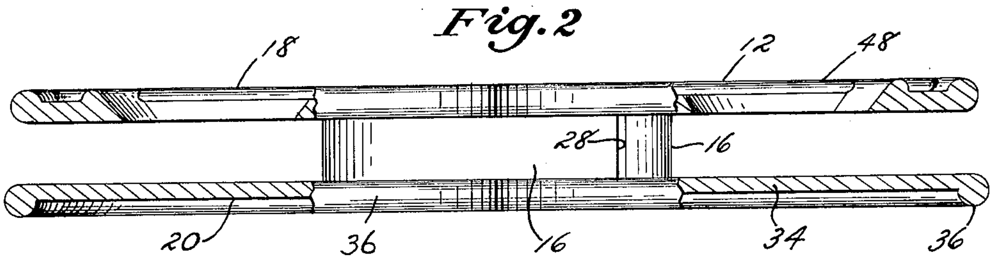
FIGURE 2 is an enlarged vertical sectional view of FIGURE 1, partly in elevation.
Figure 3:
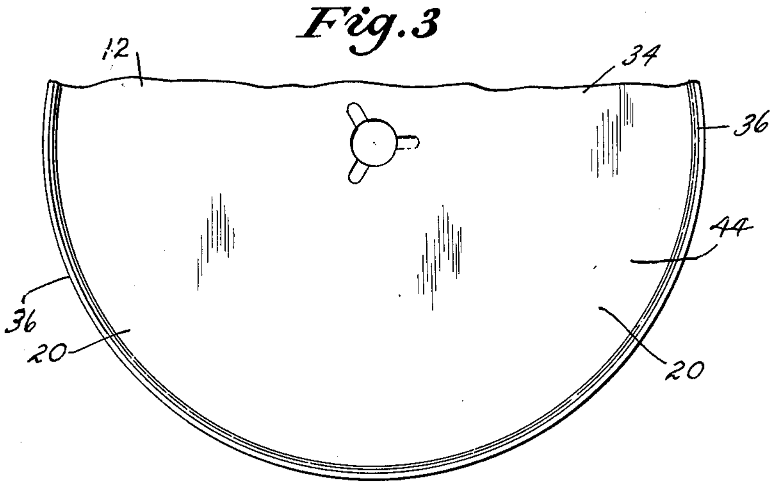
FIGURE 3 is a fragmentary bottom plan view of the assembled reel element and cover element.
Figure 4:
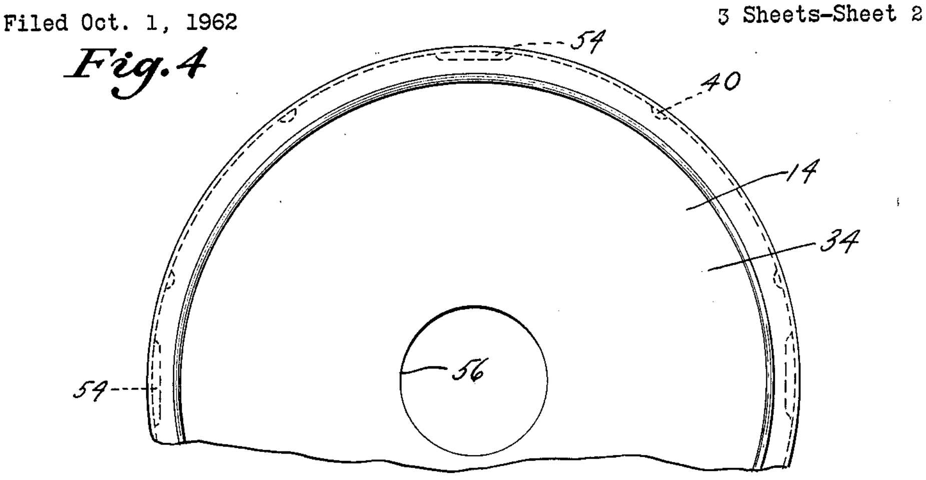
FIGURE 4 is a fragmentary top plan view of the cover element embodying the invention.
Figures 5, 8:
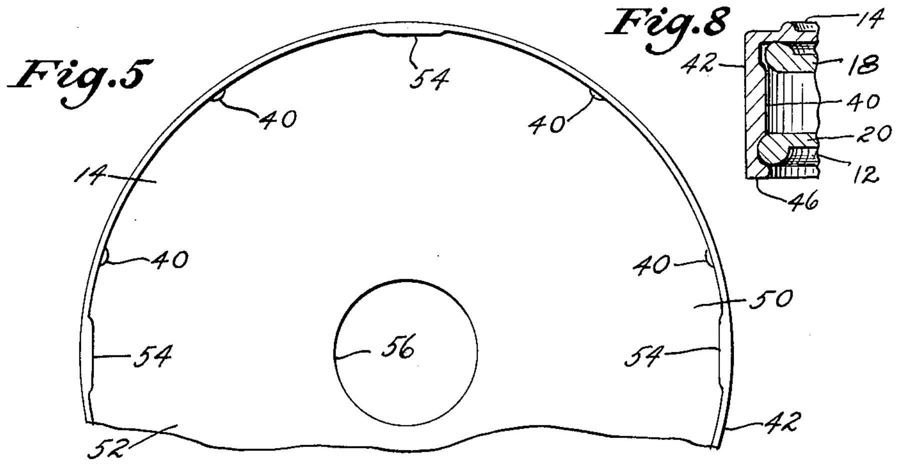
FIGURE 5 is a fragmentary bottom plan view of the cover element.
FIGURE 8 is a fragmentary vertical sectional view as might be seen from the plane 8—8 on FIGURE 7.
Figure 6:
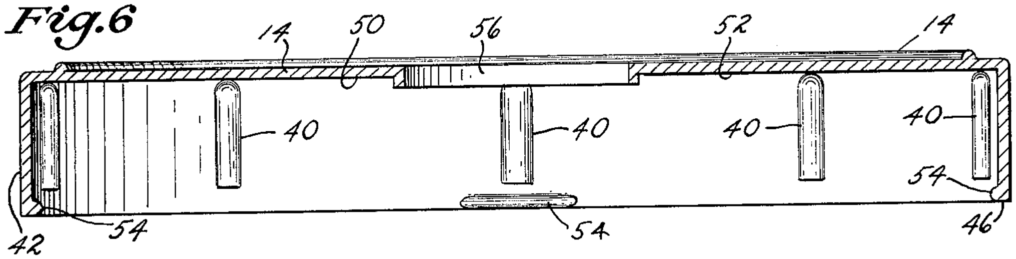
FIGURE 6 is an enlarged vertical sectional view of the cover element.
Figure 7:
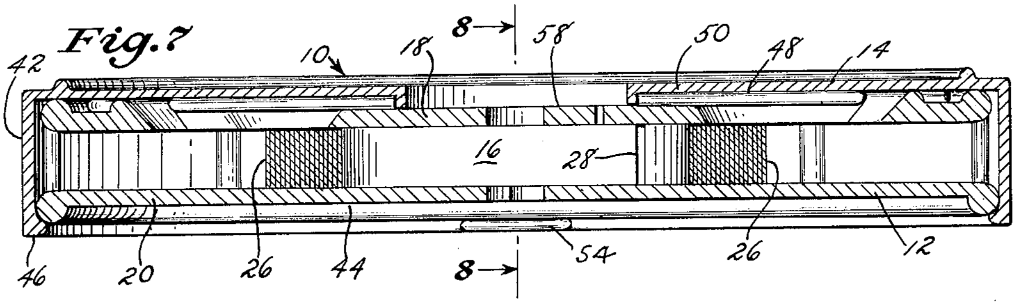
FIGURE 7 is an enlarged vertical sectional view of the reel element and the cover element in assembled condition.

The second flange member 20 is best seen in FIGURES 2 and 3 and is of closed construction, having a plane bottom wall 34 and a peripheral rib 36. The plane bottom wall 34 is preferably smooth with an edge bead forming the peripheral rib 36. The flange member 20 is preferably cast integral with the hub 16, but may be independently fabricated and secured to the hub in a suitable manner as for example by cementing.

The diameter of the second flange member 20 is substantially greater than the diameter of the first flange member 18, the difference in their diameters being such that the first flange member 18 may pass between the second flange member locating means 40 disposed on the inner surface of the peripheral rim 42 of cover element 14, while the second flange member 20 will abut against the means 40, so that the outer surface 44 of the flange member 20 (which forms a bottom wall) may be slightly inward or substantially flush with the free edge 46 of the rim 42, when surface 48 is immediately opposite or in contact with the surface 50 of the main cover wall 52.

The cover element 14 is generally in the shape of a shallow cup including the main cover wall 52 and the peripheral rim 42. The rim 42 is preferably just deep enough to fully contain the reel element 12 and is slightly resilient due to its composition and construction, so that it may flex sufficiently to allow the inwardly projecting protuberances 54 to ride and snap over the outer edge of the second flange member 20, this edge is the peripheral rim 36 on FIGURE 2.

The main cover wall 52 is provided with an opening 56 which exposes a portion of the surface 48 of the first flange member 18. The surface 48 closes the opening 56 to complete the packaging of the tape or film strip 26 but digital pressure on the exposed portion 58 of surface 48 enables the user to force the edge (peripheral rim 36) of the second flange member outwardly past the protuberances 54 to remove the reel element 12 from the cover element 14. This means that the surface 34 moves right out of the cover element 14. Thus the protuberances 54 and the rim 36 of the second flange member 20 form detachable attaching means for removably securing the cover element 14 on the reel element 12, and when the cover element has been thus removed, the reel element 12 may be quickly and conveniently used in a normal manner.

Figure 9:
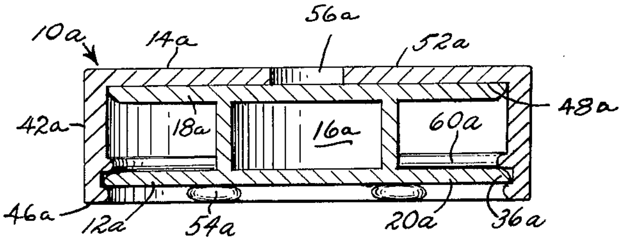
FIGURES 9, 10 and 11 are vertical sectional views corresponding to FIGURE 7 but showing three modifications.
Figure 10:
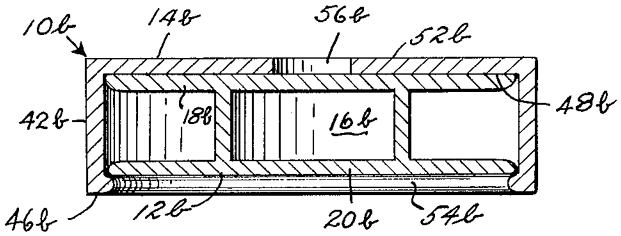
Figure 11:
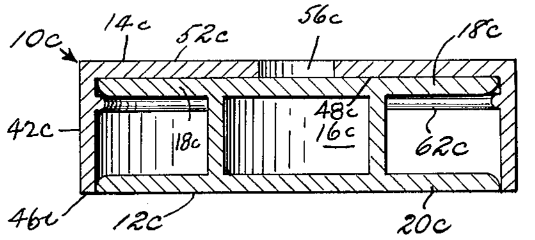

Turning to the modifications in FIGURES 9, 10, and 11, to avoid needless repetition, certain of the parts corresponding to those already described are given the same reference characters with the addition of the suffixes *a*, *b*, and *c*, respectively.

In the modification in FIGURE 9, the principal difference is the provision of an inwardly projecting ledge or bead **60*a* which is annular and supports the rim 36*a* all around. Thus in the closed condition of the device 10*a*, the second flange member 20*a* is positioned against inward movement by the bead 60*a* and against outward movement by the protuberances 54*a*. The first flange member 18 is of course smaller in diameter so that it either slides past or snaps past the bead 60*a*. The rib 60*a* provides a more substantial support for the rim 36*a* than do the outer ends of the means 40**, previously described.

The modification illustrated in FIGURE 10 omits the use of the means 40 and includes a single continuous inwardly projecting ledge or rib **54*b*. In the device 10*b*, the first and second flange members 18*b* and 20*b* respectively, may be of the same diameter, but are of such size with respect to the size of the opening formed by the rib 54*b* that they may be snapped inwardly past said rib. Thus the cover element 14*b* has a snap lock on the outermost flange member of the reel element 12*b***.

In the modification of FIGURE 11 both the means 40 and the protuberances 54 are omitted, and an inwardly extending annular rib or bead **62*c* is provided. The flange members 18*c* and 20*c* may be of the same diameter, but only the innermost flange member has a snap lock action within the cover element 14*c***.

This structure in FIGURE 11 has the bead **62*c* located near the inner surface of the main cover wall 52*c*, but it is spaced a suitable distance to accommodate the thickness of the flange members 18*c* and 20*c***.

Figures 12, 13, 14:
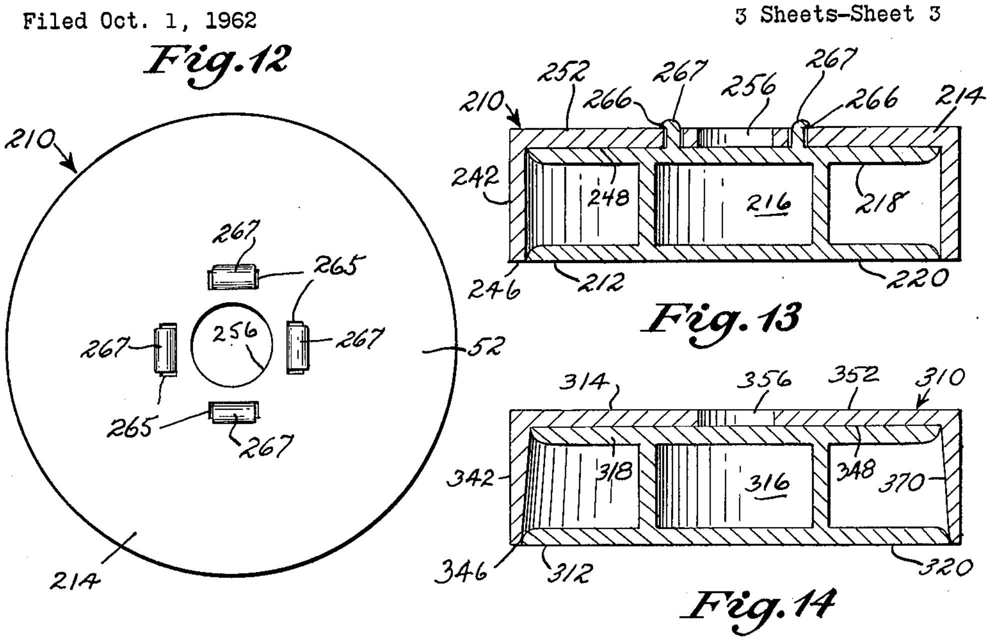
FIGURE 12 is a plan view of a second embodiment.
FIGURE 13 is a vertical sectional view of FIGURE 12.
FIGURE 14 is a vertical sectional view of a third embodiment.

Turning now to the second embodiment shown in FIGURES 12 and 13, here again certain of the parts corresponding to the first embodiment are given similar reference characters with the prefix "2." In this construction the device 210 has the inner surface of the cover element 214 unobstructed, but said cover element at the main cover wall 52 has a plurality of openings 265 which at their edges 266 coact with the snap-hooks 267 which project from the flange member 218. The snap-hooks have a reversible action so that pressure on the outer surface of the flange member 220 will seat and detachably engage the reel element 212 within the cover element 214, while digital pressure down through the opening 256 will separate the element 212 and 214, for ready use.

In the third embodiment, comparable parts are given reference characters corresponding to the first embodiment with the addition of the prefix "3." The third embodiment differs from the first principally in the incorporation of a converging or inwardly tapering member or wall on the inner surface of the rim 342, indicated by reference character 370. In this construction the reel element 312 seats within the cover element 314 with a gentle wedging action which holds it securely in place, yet digital pressure through the opening 356 discharges the reel element ready for immediate use.

It is to be noted that a convenient way of putting a cover element on a reel element is to place the reel element on a table or other flat surface and to press the cover element down over it.

I wish it to be understood that I do not consider the invention limited to the exact details of construction shown and described, for obvious modifications will occur to a person skilled in the art to which the present invention relates.

I claim:

1. In a combination reel and cover for use with a strip, the improvement comprising: a reel element having a hub, a first flange member radiating from said hub, a second flange member radiating from said hub of greater diameter than said first flange member; a cover element having a main cover wall and a peripheral rim, limiting means comprising a plurality of radially arranged protuberances on an inner surface of said peripheral rim, said limiting means permitting the first flange to pass unrestricted into said cover while selectively contacting an inwardly disposed surface of said second flange member to prevent the same from entering said cover beyond said limiting means, and a plurality of flexible inwardly projecting protuberances on said inner surface of said rim detachably engaging a second oppositely disposed surface of said second flange to maintain said reel element within said cover element.

2. In a combination reel and cover for use with a strip, the improvement comprising: a reel element having a hub, a first flange member radiating from said hub, a second flange member radiating from said hub of greater diameter than said first flange member; a cover element having a main cover wall and a peripheral rim, limiting means comprising a continuous annular rib on an inner surface of said peripheral rim, said limiting means permitting the first flange to pass unrestricted into said cover while selectively contacting an inwardly disposed surface of said second flange member to prevent the same from entering said cover beyond said limiting means, and a plurality of flexibly inwardly projecting protuberances on said inner surface of said rim detachably engaging a second oppositely disposed surface of said second flange to maintain said reel element within said cover element.

References Cited by the Examiner

UNITED STATES PATENTS

| | | | |
|---|---|---|---|
| 1,371,786 | 3/1921 | Hummell | 206—52 |
| 1,794,280 | 2/1931 | Denniss | 206—59 |
| 2,422,032 | 6/1947 | Mihalyi | 206—52 |
| 2,999,578 | 9/1961 | Holden | 206—52 |
| 3,002,610 | 10/1961 | Granger | 206—52 |
| 3,075,627 | 1/1963 | Kuckhoff | 206—52 X |

FOREIGN PATENTS

| | | |
|---|---|---|
| 439,185 | 12/1935 | Great Britain. |

LOUIS G. MANCENE, *Primary Examiner.*

THERON E. CONDON, *Examiner.*